Patented May 25, 1937

2,081,718

UNITED STATES PATENT OFFICE 2,081,718

PRODUCTION OF AMINOALKYL SULPHONES

Hanns Ufer, Ludwigshafen-on-Rhine, Germany, assignor to General Aniline Works, Inc., New York, N. Y., a corporation of Delaware No Drawing. Application January 3, 1936, Serial No. 57,373. In Germany January 22, 1935

15 Claims. (Cl. 260—124)

The present invention relates to the production of aminoalkyl sulphones by reacting sulphinic acid salts with halogen alkyl amines.

I have found that aminoalkyl sulphones capable of wide employment are obtained by reacting sulphinic acid salts with halogen alkylamines. For example from the sodium salt of tolylsulphinic acid and beta-chlor-ethylamine, or ethyl-beta-chlor-ethylamine, or diethyl-beta-chlor-ethylamine there is obtained (beta-aminoethyl)-para-tolyl sulphone ($CH_3 \cdot C_6H_4 \cdot SO_2 \cdot CH_2 \cdot CH_2 \cdot NH_2$) or (beta-ethylaminoethyl)-para-tolyl sulphone ($CH_3 \cdot C_6H_4 \cdot SO_2 \cdot CH_2 \cdot CH_2 \cdot NH \cdot C_2H_5$) or (beta-diethylaminoethyl)-para-tolyl sulphone $$CH_3 \cdot C_6H_4 \cdot SO_2 \cdot CH_2 \cdot CH_2 \cdot N : (C_2H_5)_2,$$

and from the sodium salt of para-tolylsulphinic acid and ethyl-di-beta-chlor-ethylamine or tri-beta-chlor-ethylamine, there is obtained the compound having the composition $$(CH_3 \cdot C_6H_4 \cdot SO_2 \cdot CH_2 \cdot CH_2)_2 : N \cdot C_2H_5$$

or $$(CH_3 \cdot C_6H_4 \cdot SO_2 \cdot CH_2 CH_2)_3 N$$

The reaction may be carried out in the presence of water or in the presence of organic diluents, as for example alcohols and ketones. In order to obtain good yields it is frequently necessary to add the halogenalkylamines to the reaction mixture in the form of their salts and only then to set the base free by an addition of an alkali or alkaline earth metal hydroxide, an alkali metal carbonate or alcoholate or another substance having an alkaline action. It is especially advantageous to keep the reaction mixture neutral or slightly acid to litmus but neutral to Congo, in order to avoid a conversion into other products.

A great variety of sulphinic acids may be employed for the reaction, as for example alkyl and hydroxyalkyl sulphinic acids (ethane, propane, isopentane, octodecane, octodecene and hydroxyethyl-sulphonethane sulphinic acids), alkyl disulphinic and polysulphinic acids (ethane disulphinic acid and pentane disulphinic acid), hydroaromatic sulphinic acids (tetrahydronaphthalene sulphinic acid), aromatic sulphinic acids (benzene, toluene, diphenyl, naphthalene, anthracene and anthraquinone monosulphinic and polysulphinic acids), monosulphinic and polysulphinic acids of heterocyclic compounds (furane and thiophenesulphinic acids) and aralkyl sulphinic acids (benzyl sulphinic acid). The said compounds may also contain other atoms or atomic groups as for example halogen atoms, tertiary combined nitrogen atoms, alkyl, alkoxy, hydroxyalkyl, nitro, hydroxyl, carboxylic or sulphonic acid groups. Methyl-, ethyl-, methoxy-, hydroxyethyl, nitro-, hydroxy- or diethylamino- or acetyl-aminosulphinic acids or benzene, naphthalene or anthracene and also sulphonic acids of benzoic acid and its derivatives may, for example, also be used. Furthermore, the sulphinic acids may also contain at least one nitrogen atom combined with one or more hydrogen atoms or at least one sulphhydryl group. In the latter case, the known reactions on the acid groups may also take place in addition to the reaction according to this invention.

Of the salts of the said sulphinic acids, those are most suitable which have a satisfactory solubility in the solvent employed, in particular the alkali and alkaline earth metal salts.

A great variety of primary, secondary or tertiary halogenalkylamines containing one or more halogen atoms may be used for the process according to this invention. Dialkylmonohalogenalkylamines, as for example beta-chlorethyl-(or propyl-, butyl-, isopropyl)-di-ethyl-(or propyl-, butyl-, isobutyl-, dodecyl-, octodecyl-, octodecenyl-) amines have proved especially suitable.

The reaction is carried out by heating to temperatures of from about 40° to about 200° C. especially between 60° and 140° C., if desired under pressure.

The compounds obtainable according to this invention are especially valuable for the preparation of dyestuffs.

The following examples will further illustrate how my present invention may be carried out in practice but the invention is not restricted to these examples. The parts are by weight.

*Example 1*

A solution of 17 parts of beta-chlorethyl-diethyl-amine hydrochloride in 30 parts of ethanol is added to a hot mixture of 18 parts of the sodium salt of para-toluenesulphinic acid, 4 parts of sodium hydroxide and 90 parts of ethanol. There is immediately formed a colorless precipitate; the reaction is completed by heating for several hours under reflux at about 80° C. After cooling, the undissolved residue is filtered off by suction and the (beta-diethylaminoethyl)-para-tolyl sulphone ($CH_3 \cdot C_6H_4 \cdot SO_2 \cdot CH_2 \cdot CH_2 \cdot N : (C_2H_5)_2$) formed is precipitated from the filtrate in the form of its oxalate by the addition of an alcoholic solution of oxalic acid. It may be purified by crystallization from ethanol. Colorless crystals are thus obtained which melt at from 165° to 166° C.

Example 2

A mixture of 22 parts of the sodium salt of para-acetamino-benzene sulphinic acid, a solution of 2.3 parts of metallic sodium in 150 parts of hot ethanol and a solution of 18 parts of beta-chlorethyl-diethylamine hydrochloride in 30 parts of ethanol is heated under reflux for a short time. An abundant separation of crystals thereby takes place. The whole is heated for a further three or four hours to complete the reaction. After cooling, any constituents remaining undissolved are filtered off by suction and the (beta-diethyl-amino-ethyl) - para-acetaminophenyl sulphone (CH₃·CO·NH·C₆H₄·SO₂·CH₂·CH₂·N:(C₂H₅)₂) formed is obtained in the form of a yellow oil by evaporation of the alcoholic filtrate. The oil may be freed from any impurities still present by dissolution in methanol, filtering off by suction the undissolved constituents and evaporating the methanol solution. It is a pale yellow syrup which dissolves in methanol giving a clear solution and which solidifies giving a crystalline mass when allowed to stand for long periods.

Example 3

A solution prepared by dissolving at from 60° to 80° C. 350 parts of para-toluene sulphinic acid sodium salt in 500 parts of water is rendered neutral to litmus and a solution of 344 parts of beta-chlorethyl - diethylaminehydrochloride in 500 parts of water which had been rendered neutral to Congo is added. The mixture thus obtained is heated for about 5 hours at about 100° C., a small amount of active carbon being then added. After filtering and cooling, the compound formed corresponding to the formula

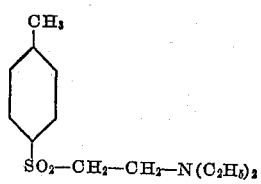

is separated from the solution as an almost colorless oil by the addition of sodium carbonate.

If for example beta-chlordimethylamine, beta-chlorethyl-dibutylamine or beta-chlorpropyl-butylethylamine be employed instead of beta-chlorethyldiethylamine, the corresponding sulphone alkylamines are obtained in similar manner.

Example 4

To a solution of 229 parts of 4-methoxy-3-acetamino-benzene sulphinic acid sodium salt in 500 parts of water which is neutral to litmus a solution of 172 parts of beta-chlorethyl-diethylamine-hydrochloride in 200 parts of water neutral to Congo is added. The mixture obtained is heated for 5 hours at about 90° to 95° C. After cooling and removing small amounts of undissolved parts by means of active carbon the compound obtained in a very good yield and corresponding to the formula

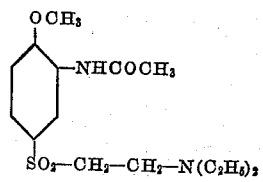

is precipitated by the addition of sodium carbonate in the form of colorless crystals, which when recrystallized from dibutyl ether melt at 102° to 103° C.

By saponifying the acetyl-group the amino compound corresponding to the formula

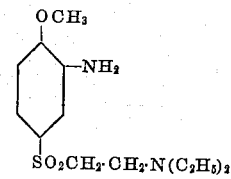

is obtained in the form of colorless crystals which melt at 75° C.

Example 5

283 parts of 4-methyl-3-acetylamino benzene sulphinic acid sodium salt are dissolved in 750 parts of water while stirring. The solution obtained is rendered slightly acid to litmus, but neutral to Congo by the addition of hydrochloric acid. A mixture of 200 parts of beta chlorethyl-diethylamine hydrochloride, 250 parts of water and 80 parts of glacial acetic acid is dropped into the above solution within two hours while stirring and heating to boiling the reaction mixture being always kept just neutral to Congo by the addition of sodium carbonate. The mixture is then heated for a further 4 to 5 hours, care being taken that the mixture remains neutral to Congo. After cooling and filtering off by suction the undissolved constituents and washing them with dilute hydrochloric acid, the compound formed in good yield corresponding to the formula

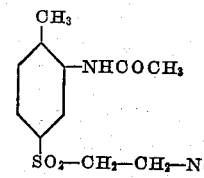

is precipitated from the filtrate by the addition of sodium carbonate.

Example 6

172 parts of beta-chlorethyl diethylamine are added to a solution of 223 parts of 4-methyl-3-nitrobenzene sulphinic acid sodium salt in 100 parts of water, which solution had been rendered slightly acid to litmus, but neutral to Congo by means of hydrochloric acid. The mixture is boiled for 4 to 5 hours while stirring and kept always slightly acid or neutral to Congo by the addition of a sodium carbonate solution. After working up the reaction mixture in the same manner as described in Example 5, the compound corresponding to the formula

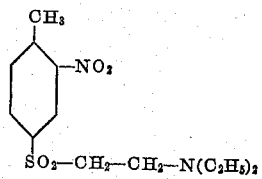

is obtained in the form of pale yellow crystals melting at 71° to 72° C.

Example 7

To a solution of 1452 parts of the sodium salt of 1-methyl-4-acetylamino-2-benzene sulphinic acid in 3500 parts of water having a from neutral to slightly acid reaction to litmus, there is added at about 80° C. a solution of 1120 parts of beta-chlorethyl diethylamine hydrochloride while stirring. The mixture is then heated for from 3 to 4 hours at about 75° C., while it is always kept slightly acid to litmus, but neutral to Congo by the addition of sodium carbonate solution. After cooling and filtering off by suction undissolved constituents and washing them with dilute hydrochloric acid, the compound corresponding to the formula

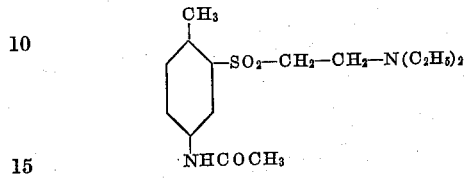

is precipitated from the filtrate by the addition of sodium carbonate.

What I claim is:—

1. A process of producing aminoalkyl sulphones which comprises reacting sulphinic acid salts with halogen alkylamines.
2. A process of producing aminoalkyl sulphones which comprises reacting sulphinic acid salts with salts of halogen alkylamines.
3. A process of producing aminoalkyl sulphones which comprises reacting sulphinic acid salts with halogen alkylamines in the presence of diluents.
4. A process of producing aminoalkyl sulphones which comprises reacting sulphnic acid salts with halogen alkylamines in the presence of water.
5. A process of producing aminoalkyl sulphones which comprises reacting sulphinic acid salts with halogen alkylamines in a solution from neutral to acid to litmus.
6. A process of producing aminoalkyl sulphones which comprises reacting sulphinic acid salts with halogen alkylamines at temperatures of from 40° to 200° C.
7. A process of producing aminoalkyl sulphones which comprises reacting sulphinic acid salts with halogen alkylamines at temperatures of from 60° to 140° C.
8. The process of producing acyl aminoaryl aminoalkyl sulphones which comprises reacting acylaminoaryl sulphinic acid salts with halogen alkylamines.
9. The process of producing acylaminoaryl aminoalkyl sulphones which comprises reacting a 1-methyl-2-acetylamino-4-benzene sulphinic acid alkali salt with halogen alkylamines.
10. The process of producing acylaminoaryl aminoalkyl sulphones which comprises reacting a 1-methyl-4-acetylamino-2-benzene sulphinic acid alkali salt with halogen alkylamines.
11. The process of producing acylaminoaryl aminoalkyl sulphones which comprises reacting a 1-methoxy-2-acetylamino-4-benzene sulphinic acid alkali salt with halogen alkylamines.
12. Dialkylaminoalkyl acylaminoaryl sulphones.
13. ($\beta$-diethylamino-ethyl)-(1-methyl-2-acetylamino-benzene-4-)-sulphone.
14. ($\beta$-diethylamino-ethyl)-(1-methyl-4-acetylamino-benzene-2-)sulphone.
15. ($\beta$-diethylamino-ethyl)-(1-methoxy-2-acetylamino-benzene-4-)-sulphone.

HANNS UFER.